United States Patent
Schroeder

(10) Patent No.: US 7,221,819 B2
(45) Date of Patent: May 22, 2007

(54) OPERATING AN OPTICAL SWITCH AT A NEGATIVE PRESSURE DIFFERENTIAL

(75) Inventor: Dale W. Schroeder, Scotts Valley, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 325 days.

(21) Appl. No.: 10/211,196

(22) Filed: Aug. 1, 2002

(65) Prior Publication Data

US 2004/0022481 A1   Feb. 5, 2004

(51) Int. Cl.
  *G02B 6/35* (2006.01)
(52) U.S. Cl. .......................................... 385/18; 385/16
(58) Field of Classification Search ............. 385/16–24
  See application file for complete search history.

(56) References Cited

U.S. PATENT DOCUMENTS

| 5,699,462 | A | 12/1997 | Fouquet et al. |
| 5,960,131 | A | 9/1999 | Fouquet et al. |
| 6,055,344 | A | 4/2000 | Fouquet et al. |
| 6,160,928 | A | 12/2000 | Schroeder |
| 6,188,815 | B1 | 2/2001 | Schiaffino et al. |
| 6,195,478 | B1 | 2/2001 | Fouquet |
| 6,198,856 | B1 | 3/2001 | Schroeder et al. |
| 6,320,994 | B1 | 11/2001 | Donald et al. |
| 6,320,995 | B1 | 11/2001 | Schroeder |
| 6,324,316 | B1 | 11/2001 | Fouquet et al. |
| 6,327,397 | B1 | 12/2001 | Schiaffino et al. |
| 6,377,873 | B1 * | 4/2002 | Troll .......................... 700/275 |
| 2003/0091266 | A1 | 5/2003 | Troll |

* cited by examiner

Primary Examiner—Kevin S. Wood

(57) ABSTRACT

An optical switch having liquid or vapor bubbles at switching sites operates with a fluid pressure less than the vapor pressure of the liquid. This negative pressure differential reduces the energy required to maintain a bubble at a switching site. Local heating provides the energy to create or maintain a bubble and activate a switching site, and turning off the heating collapses the bubble and deactivates the switching site.

15 Claims, 2 Drawing Sheets

OPERATING AN OPTICAL SWITCH AT A NEGATIVE PRESSURE DIFFERENTIAL

BACKGROUND

Optical switches, which can directly manipulate optical signals, are becoming increasingly important for optical networking. Accordingly, several techniques for switching optical signals have been developed. FIG. 1 shows a plan view of an optical switch 100 that uses some of the optical switching techniques described in U.S. Pat. No. 5,699,462, to Fouquet et al., entitled "Total Internal Reflection Optical Switches Employing Thermal Activation." As illustrated in FIG. 1 and in the cross-sectional views of FIGS. 2A and 2B, optical switch 100 includes a planar lightwave circuit 110, a semiconductor substrate 120, a base plate 130, and a reservoir 140.

Planar lightwave circuit 110 is a plate of an optical material such as quartz containing crossing waveguide segments 112 and 114 and cavities 116 at the intersections of waveguide segments 112 with waveguide segments 114. Optical signals are generally input to optical switch 100 on one set of waveguide segments 112 or 114, and cavities 116 act as switching sites for the optical signals. In particular, a cavity 116 when filled with a liquid 142 having a refractive index matching the refractive index of the waveguides 112 and 114 transmits an optical signal from an input waveguide segment 112 or 114 into the next waveguide segment 112 or 114 along the same path. FIG. 2A shows a cavity 116 filled with liquid 142 from reservoir 140.

A cavity 116 becomes reflective for switching of an optical signal when the cavity contains a bubble. More specifically, total internal reflection at an interface 115 between an input waveguide 112 or 114 and a vapor bubble 146 (as shown in FIG. 2B) switches an optical signal into a crossing waveguide segment 114 or 112. Selectively activating or making reflective one of the cavities 116 along the initial path of an optical signal can switch the optical signal onto any of the crossing waveguide segments 114 or 112. If none of the cavities 116 along the path of an optical signal are reflective, the optical signal passes straight through optical switch 100.

Semiconductor substrate 120 contains electronic circuitry that includes heating elements 122 positioned in cavities 116. Selectively activating a heating element 122 vaporizes liquid in the corresponding cavity 116 and activates (i.e., makes reflective) the switching site corresponding to the cavity 116 containing the activated heating element 122. The activated heating element 122 then continues heating to keep the bubble stable and the switching site reflective. If the heating element 122 is turned off, bubble 146 and surrounding liquid 142 cool, causing bubble 146 to collapse and the cavity 116 to refill with liquid 142.

Base plate 130 acts as a heat sink for semiconductor chip 120 but also includes an inlet 136 connected to reservoir 140. Inlet 136 and a hole 126 through semiconductor substrate 120 allow liquid 142 to flow between reservoir 140 and a thin fluid channel 118 underlying the cavities 116. In particular, when a bubble 146 forms or collapses to activate or deactivate a switching site, fluid 142 flows to or from reservoir 140.

Reservoir 140 is partially filled with liquid 142 and partially filled with a gas 144, typically vapor from liquid 142. The pressure of gas 144 controls the pressure of liquid 142 and therefore controls the difficulty of forming bubbles in cavities 116. U.S. Pat. No. 6,188,815 issued Feb. 13, 2001 to Schiaffino et al., entitled "Optical Switching Device and Method Utilizing Fluid Pressure Control to Improve Switching Characteristics," describes how a pressure controlling mechanism in reservoir 140 can elevate the pressure of liquid 142 to avoid inadvertent formation of bubbles that might cause improper switching in switch 100.

Optical switches similar to switch 100 have proven effective for switching optical signals. However, improvements are sought in several areas. Energy consumption, for example, in switch 100 can be significant when several switching sites are simultaneously activated. When a switching site is activated, the corresponding heating elements 122 must locally maintain a temperature high enough to prevent collapse of the bubble 146 in the overlying cavity 116. This constant drain of energy continues even when the routing of optical signals through optical switch 100 remains constant. The energy consumption also generates heat that can be difficult to dissipate, particularly in compact optical switches having a high density of heating elements 122. The heating is also localized to small areas, which can lead to damage and failure of electronic circuitry. The limits on the amount of heating that can be practically maintained limits the types of liquid that an optical switch can use. Specifically, some liquids require too much heating to create and maintain a bubble.

Another concern for optical switch 100 is condensation and distillation that can occur in cavities 116 containing bubbles 146. Each bubble 146 is kept at an elevated temperature to maintain the vapor pressure inside bubble 146 and thereby prevent the bubble 146 from collapsing. The heated vapor in the bubble 146 can condense onto the cooler walls of the cavity 116. Condensation at interface 115 between a cavity 116 and an input waveguide segment 112 or 114 can cause spectral reflection, resulting in signal loss when less of the optical signal reflects into the desired output waveguide segment 114 or 112 and resulting in noise if part of the optical signal reflects into other waveguide segments.

Condensation can also cause local distillation when liquid 142 contains two or more separable compounds. The distillation can locally change the composition and therefore the refractive index of liquid 142. Having matching refractive indices for liquid 142 and waveguide segments 112 and 114 is critical to avoiding intolerable levels of reflection at switching sites intended to be transparent. The distillation problem limits the suitable choices for liquid 142 to liquids that resist distillation that changes the liquid's index of refraction.

In view of the limitations in existing optical switches, there is a need for structures and operating methods that expand the choices of suitable liquids for better index matching in optical switches and that reduce the power consumption and heat generation in optical switches.

SUMMARY

In accordance with an aspect of the invention, an optical switch operates with a liquid at a fluid pressure and an operating temperature such that the vapor pressure of the liquid at the operating temperature is greater than the fluid pressure. In this operating regime, a negative pressure difference between the fluid pressure and the vapor pressure of the liquid reduces the amount of heating required to maintain a bubble in the optical switch. Accordingly, an optical switch operating with a liquid having a vapor pressure that is greater than the fluid pressure of the liquid can operate at reduced power when using liquids conventionally employed in optical switches and can use liquids that require too much heating for use in conventional optical switches.

An optical switch employing aspects of the invention can be energy efficient because less local heating is required to maintain the reflective state of switching sites. The reduced heating can extend the useful life of the optical switch. Switching sites can also provide cleaner reflections for higher signal-to-noise ratios (SNRs) because the temperature differential between the bubbles and surrounding cavity walls is reduced causing less condensation reflective surfaces.

One specific embodiment of the invention is an optical switch having an optical structure including crossing waveguide segments with cavities at the intersections of the waveguide segments. A liquid in communication with the cavities has an index of refraction matching an index of refraction of the waveguide segments and has a fluid pressure that is less than a partial vapor pressure of the liquid. Each cavity is either filled with the liquid or with vapor, depending on whether a corresponding heating element is heating or not. Locally heating the liquid in a cavity to maintain a vapor bubble requires less power because the vapor pressure before heating is already greater than the fluid pressure. However, the difference between the fluid pressure and the partial vapor pressure of the liquid is generally less than a surface tension of a bubble filling one of the cavities, so that the bubbles collapse when the corresponding heating elements stop heating. The nucleation energy of the liquid, surface tension in the liquid, and separation of switching sites prevent unintended bubble formation.

Another embodiment of the invention is a method for operating an optical switch. The method includes filling a cavity that is at an intersection of a first waveguide segment and a second waveguide segment with a liquid and maintaining the liquid at a fluid pressure that is less than a partial vapor pressure of the liquid at a temperature of the cavity. Heating the liquid can overcome a nucleation energy of the liquid and create a vapor bubble in the cavity, but if the difference between the vapor pressure and the fluid pressure is less than the surface tension on the vapor bubble, the vapor bubble collapses when the heating ends.

BRIEF DESCRIPTION OF THE DRAWINGS

Use of the same reference symbols in different figures indicates similar or identical items.

DETAILED DESCRIPTION

In accordance with an aspect of the invention, an optical switch operates a liquid at a fluid pressure and an operating temperature such that the fluid pressure is less than the vapor pressure of the liquid. The nucleation energy of the liquid and the surface tension of a bubble smaller than or having the same size as a switching site in the optical switch prevent bubbles from spontaneously forming or persisting without heating. In this pressure regime, less heating is required to maintain a bubble in a switching site. An optical switch thus requires less power for operation. The reduced heating also extends the life of heating elements in the switch and permits use of heating element that might not be suitable for higher heating levels. The optical switch can also use liquids that require too much heating for practical use in conventional optical switches.

Figure 1:
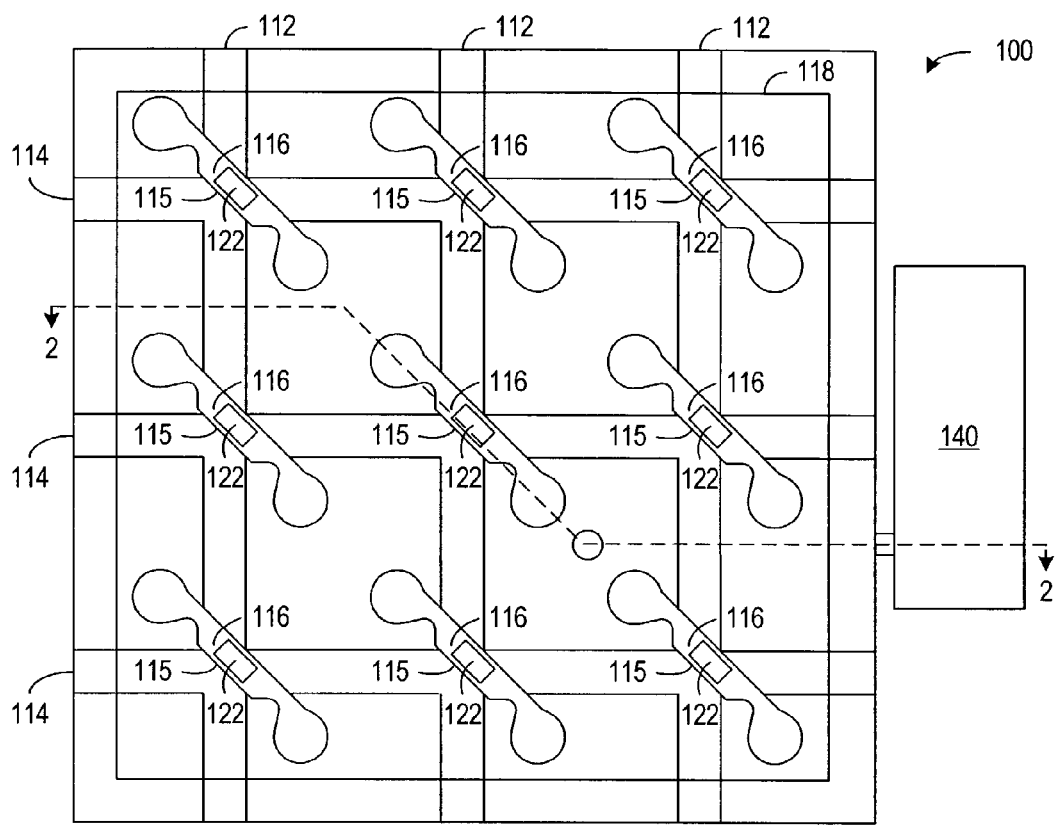
FIG. 1 shows a plan view of an optical switch.
Figure 2A:
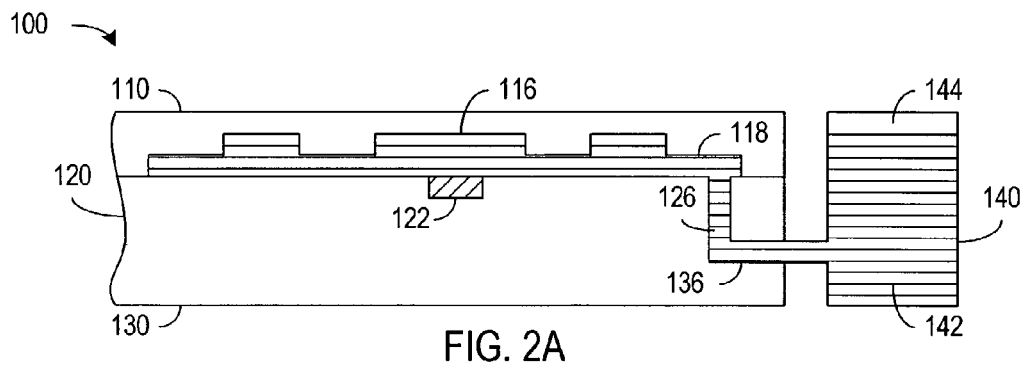
FIGS. 2A and 2B show cross-sectional views of the optical switch of FIG. 1 respectively without and with a reflective switching site.
Figure 2B:
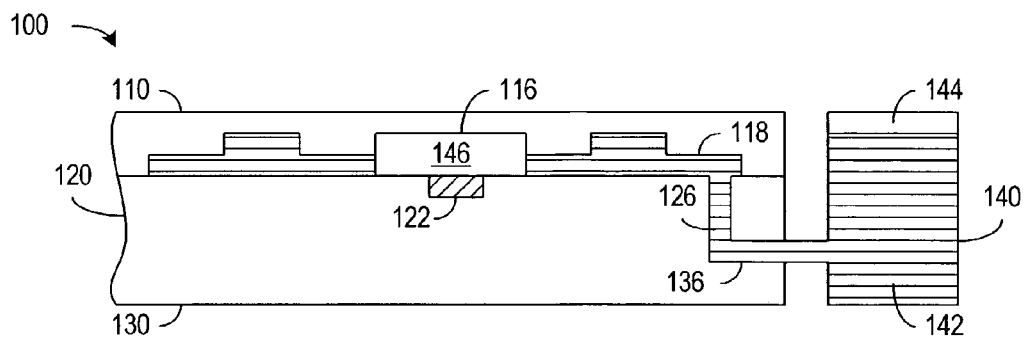
Figure 3A:
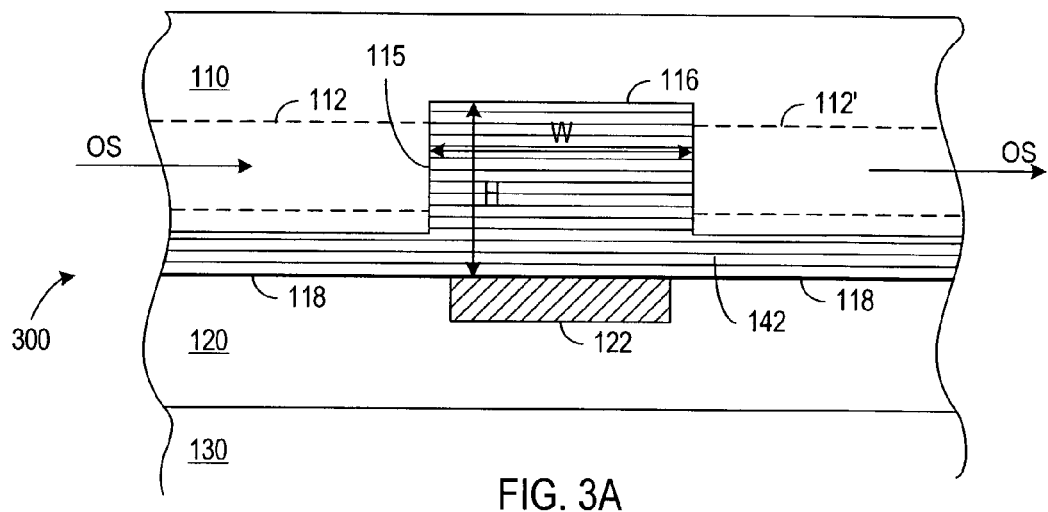
FIGS. 3A, 3B, and 3C are cross-sectional views of a switching site and illustrate a bubble creation process in accordance with an embodiment of the invention.
Figure 3B:
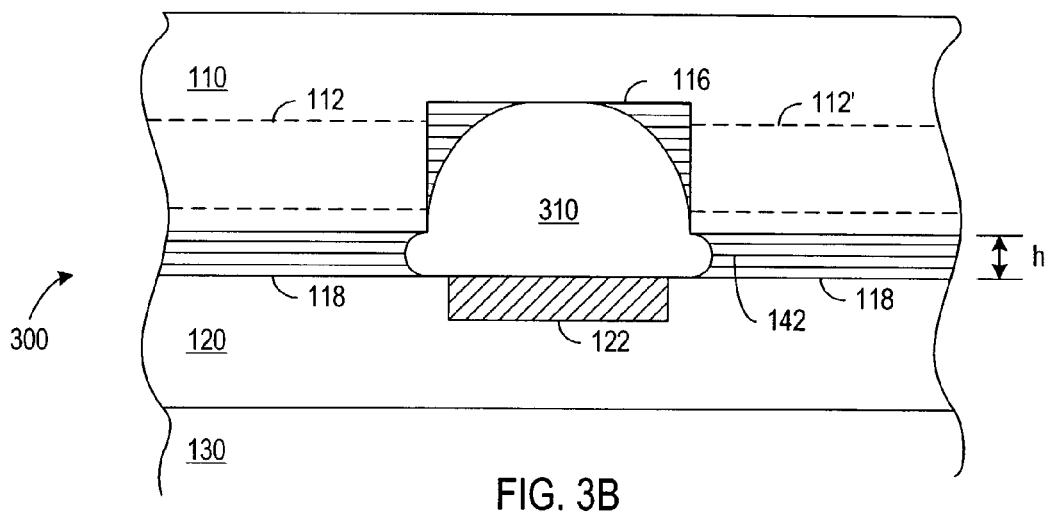
Figure 3C:
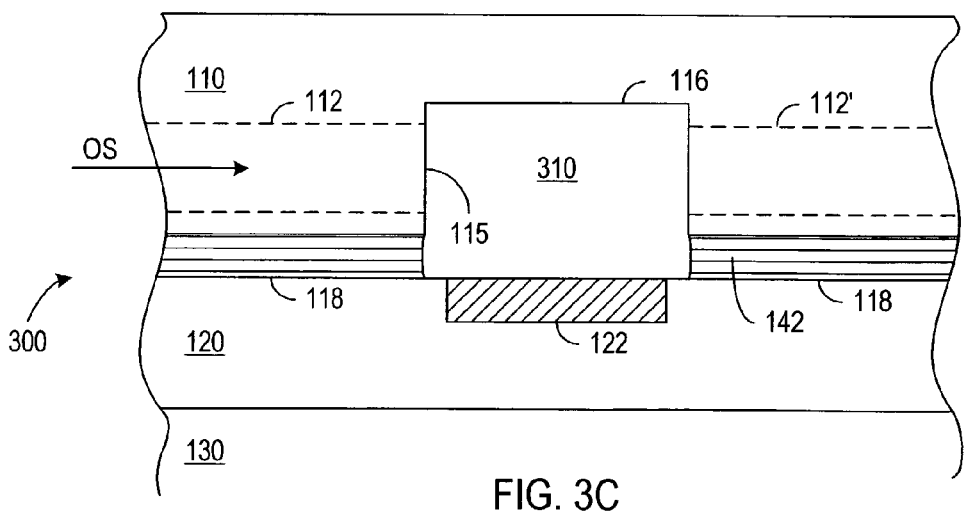

FIGS. 3A, 3B, and 3C show cross-sectional views of a switching site 300 in an optical switch such as optical switch 100 illustrated in FIGS. 1, 2A, and 2B. Switching site 300 includes a cavity 116 formed between a planar lightwave circuit 110 and an underlying semiconductor substrate 120. Cavity 116 has typical dimensions of about 40×15×80 µm. Waveguide segments 112 and 112' have core regions of higher index of refraction that guide optical signals in planar lightwave circuit 110. Generally, the optical switch and switching site 300 can be structurally identical to existing optical switches and switching sites except for use of the fluid pressure or temperature and operating methods disclosed herein. Switching site 300 may alternatively have smaller or lower-power heating elements and/or employ a fluid that is not suited for conventional optical switches.

When switching site 300 is transparent (or inactive) as shown in FIG. 3A, cavity 300 is filled with a liquid 142 having an index of refraction matching the index of refraction of the core of input waveguide 112. Liquid 142 would typically be an organic solvent such as fluorobenzene, but any liquid providing the required index of refraction and chemical and physical properties would be suitable. Input waveguide segment 112 guides an optical signal that passes through liquid 142 in cavity 116 to a following waveguide segment 112' that is collinear with input waveguide segment 112. Matching the index of refraction of liquid 142 to the index of refraction of the core of waveguide segment 112 avoids partial reflection of optical signal OS at interface 115 between waveguide segment 112 and liquid 142 in FIG. 3A.

In accordance with an aspect of the invention, an operating temperature T0 of liquid 142 and surrounding components of the optical switch and a fluid pressure Pe of liquid 142 are such that the partial vapor pressure Pv of liquid 142 at operating temperature T0 is greater than fluid pressure Pe. In optical switch 100 of FIG. 1, keeping the temperature of reservoir 140 below the operating temperature T0 of planar lightwave circuit 110, semiconductor substrate 120, and base plate 130 can provide a negative pressure differential between the fluid pressure Pe as maintained by the vapor 144 in reservoir 140 and the partial vapor pressure Pv of liquid 142 at the operating temperature T0. A temperature difference of about 10° C. between reservoir 140 and the rest of the optical switch can provide a negative pressure differential of about 3000 Pascals for a liquid such as fluorobenzene.

Contrary to what might be expected at first consideration, the liquid filled state of cavity 116 is a stable state since a bubble will not form unless sufficient energy is input to overcome the nucleation energy for bubble formation and overcome the surface tension of the liquid once a bubble forms. Typically, the nucleation energy for a liquid corresponds to approximately 82% of the critical temperature of the liquid. (The critical temperature is the temperature at which pressure is unable to maintain the liquid state and is about 287° C. for fluorobezene.) Accordingly, if switching site 300 is kept below the temperature (referred to herein as the nucleation temperature) corresponding to the bubble nucleation energy of liquid 142, the liquid filled state of switching site 300 will be stable even when the fluid pressure Pe is less than the partial vapor pressure Pv of liquid 142.

Heating of liquid 142 in switching site 300 to a temperature above the nucleation energy temperature forms a bubble 310 such as illustrated in FIG. 3B. After formation, bubble 310 expands or collapses depending on the balance between the vapor pressure Pv' inside bubble 310, the external fluid pressure Pe on bubble 310, and the surface tension S of bubble 310. The vapor pressure Pv' in bubble 310 depends on the temperature Tb of bubble 310. Bubble 310 continues expanding to fill cavity 116 if vapor pressure Pv' remains greater than the sum of the inward external fluid pressure Pe and the surface tension S as indicated in Equation 1. Generally, heating element 122 must remain active to maintain internal pressure Pv' at the level required for expansion (Equation 1). Bubble 310 contracts if outward vapor pressure Pv' drops below the sum of the inward external fluid pressure Pe and the surface tension S.

$$Pv' \geq Pe + S \qquad \text{Equation 1}$$

A conventional operation of optical switch 100 keeps fluid pressure Pe greater than the vapor pressure Pv at operating temperature T0. Thus, the temperature difference (Tb−T0) required to maintain a bubble conventionally increases in vapor pressure Pv' in the bubble 310 so that the increase in vapor pressure (Pv'−Pv) is greater than the sum of the positive pressure differential (Pe−Pv) and the surface tension S. In accordance with an aspect of the invention, the external fluid pressure Pe is reduced (i.e., less than the vapor pressure Pv at operating temperature T0), and the temperature difference (Tb−T0) needed to maintain bubble 310 is smaller. Equivalently, the pressure increase (Pv'−Pv) can be less than the surface tension S of bubble 310 by an amount equal to the negative pressure differential −(Pv−Pe).

The activation process of FIG. 3B heats a portion of the liquid in cavity 116 to above the nucleation temperature for a short period of time to create bubble 310. Bubble 310 quickly expands to fill cavity 116 as shown in FIG. 3C. Heating of bubble 310 can then be decreased to a level that maintains bubble temperature Tb at the level required for a stable bubble 310.

Bubble 310 does not extend into fluid channel 118 because at the smaller dimensions (e.g., a height h of about 5 μm) for fluid channel 118, the surface tension S overcomes the pressure difference Pv'−Pe and collapses the extension. Bubble 310 is thus confined to the selected cavity 116 as shown in FIG. 3C even though the vapor pressure Pv' is greater than fluid pressure Pe. The confinement of bubble 310 allows activating only selected switching sites 300, without unintentionally activating other switching sites.

Bubble temperature Tb of bubble 310 of FIG. 3C as noted above can be lower than the bubble temperatures required in some conventional optical switches and still maintain a stable bubble. As a result, the temperature difference (Tb−T0) between bubble 310 and the surrounding elements of the optical switch is smaller than in conventional optical switches. Condensation of vapor on the walls of the cavity and particularly on interface 115 is thus reduced, and interface 115 can more cleanly reflect incident optical signal OS from waveguide segment 112 to a waveguide segment 114 (not shown in the view of FIG. 3C). The reduced condensation also reduces distillation of the liquid that could separate liquid components when liquid 142 is a mixture.

Bubble 310 once created remains in cavity 116 as long as heating continues. To deactivate switching site 300, heating is stopped, and bubble 310 cools to the operating temperature T0. At the operating temperature, the surface tension S is greater than the difference between vapor pressure Pv and external pressure Pe and collapses bubble 310.

The selection of the negative pressure (Pe−Pv) difference between the fluid pressure Pe and the vapor pressure Pv at the operating temperature T0 determines the reduction in the amount of power required to maintain a switching site in the reflective state. For example, an exemplary embodiment of the invention that uses fluorobenzene as liquid 142 and has cavities 116 that are 40×15×80 μm typically requires 150 mW of power to maintain a bubble in a cavity 116 when the fluid pressure Pe is equal to the vapor pressure Pv (e.g., when reservoir 140 is at the operating temperature T0.) This exemplary embodiment can reduce the required power from 150 mW to 25 mW by creating a negative pressure difference (Pe−Pv) of about 3000 Pascals (e.g., when reservoir 140 is 10° C. below operating temperature T0.) Further power reductions can be achieved by further decreasing the fluid pressure Pe. However, if the fluid pressure Pe is too low, the time required for a bubble to collapse when heating stops increases significantly, and the switching time of the optical switch may become unacceptably slow.

Operating an optical switch at a negative pressure differential also provides the advantage of expanding the choices for suitable liquids. For example, a liquid such as 2-fluoro-toluene requires a high level of heating to maintain a bubble when the fluid pressure Pe is greater than or equal to the partial vapor pressure Pv at the operating temperature T0. The high level of heating often causes conventional heating elements to quickly burn out or otherwise fail. Accordingly, 2-fluoro-toluene is unsuitable for use in an optical switch unless the early failures can be avoided. Using a fluid pressure Pe that is less than vapor pressure Pv reduces the heating required to maintain a bubble in 2-fluoro-toluene and makes use of 2-fluoro-toluene practical in optical switches. This and other expansions of the choices for suitable liquids for an optical switch reduces the difficulty of finding a liquid having an index of refraction that matches the index of refraction of waveguides in the optical switch.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. An optical switch comprising:
    an optical structure at a first temperature and containing:
        a set of first waveguide segments;
        a set of second waveguide segments defining optical paths that cross optical paths of the first waveguide segments; and
        a set of cavities at intersections of the first waveguide segments and the second waveguide segments; and
    a liquid having an index of refraction matching an index of refraction of the first and second waveguide segments, wherein the liquid is in communication with the cavities, is at the first temperature adjacent to the optical structure, and has a pressure that is less than a partial vapor pressure of the liquid at the first temperature; and
    a reservoir in fluid communication with the cavities, wherein the reservoir contains a vapor in contact with the liquid, the reservoir being at a second temperature that is lower than the first temperature, wherein the vapor maintains the pressure of the liquid to be less than the partial vapor pressure of the liquid at the first temperature.

2. The optical switch of claim 1, wherein a difference between the pressure and the partial vapor pressure of the liquid is less than a surface tension of a bubble filling one of the cavities.

3. The optical switch of claim 1, wherein the liquid fills one or more of the cavities, and heated vapor bubbles from the liquid are in one or more of the cavities.

4. The optical switch of claim 1, further comprising a set of heating elements, wherein each heating element is in a corresponding one of the cavities.

5. The optical switch of claim 1, wherein:
   the liquid in the reservoir is approximately at the average temperature of the liquid; and
   the vapor in the reservoir has a temperature lower than the average temperature of the liquid.

6. A method for operating an optical switch, comprising:
   filling a cavity that is at an intersection of a first waveguide segment and a second waveguide segment with a liquid, wherein the liquid extends from the cavity and further fills an adjacent space in communication with the cavity; and
   maintaining the liquid at a fluid pressure that is less than a partial vapor pressure of the liquid at an average temperature of the liquid in the cavity and the adjacent space, wherein maintaining the liquid at the fluid pressure that is less than the partial vapor pressure of the liquid at the average temperature, comprises:
   maintaining the liquid in a reservoir at a first temperature; and
   maintaining a vapor pocket in the reservoir at a second temperature that is less than the first temperature.

7. The method of claim 6, wherein the first temperature is about equal to the average temperature of the liquid.

8. The method of claim 6, further comprising locally heating the liquid in the cavity to overcome a nucleation energy of the liquid and thereby create a vapor bubble in the cavity.

9. The method of claim 8, further comprising reducing the heating to maintain the vapor bubble in the cavity.

10. The method of claim 9, further comprising collapsing the vapor bubble by ending the heating.

11. The method of claim 8, further comprising collapsing the vapor bubble by ending the heating.

12. The method of claim 6, wherein a difference between the partial vapor pressure and the fluid pressure is less than a surface tension that the liquid causes on a bubble filling the cavity.

13. A method for operating an optical switch, comprising:
    filling a cavity in a lightwave circuit with a liquid that extends from the cavity to a reservoir; and
    maintaining the lightwave circuit and the liquid adjacent to the lightwave circuit at a first temperature; and
    maintaining the reservoir at a second temperature below the first temperature, wherein the reservoir contains a vapor pocket and a portion of the liquid, and the vapor pocket keeps a fluid pressure of the liquid less than a partial vapor pressure of the liquid at the first temperature.

14. The method of claim 13, further comprising locally heating the liquid to create a bubble in the cavity.

15. The method of claim 14, wherein the cavity is at an intersection of a first waveguide segment and a second waveguide segment, and creating the bubble switches a light path in the lightwave circuit from the first waveguide to the second waveguide.

* * * * *